United States Patent
Novikov et al.

(10) Patent No.: US 12,045,948 B2
(45) Date of Patent: Jul. 23, 2024

(54) IMAGE PROCESSING METHOD AND SYSTEM

(71) Applicant: Apical Limited, Cambridge (GB)

(72) Inventors: Maxim Novikov, Manchester (GB); David Hanwell, Sale (GB); Alexis Leonardo Lluis Gomez, Chelford (GB)

(73) Assignee: Arm Limited, Cambridge (GB)

( * ) Notice: Subject to any disclaimer, the term of this patent is extended or adjusted under 35 U.S.C. 154(b) by 442 days.

(21) Appl. No.: 17/387,508

(22) Filed: Jul. 28, 2021

(65) Prior Publication Data
US 2023/0032323 A1 Feb. 2, 2023

(51) Int. Cl.
  *G06T 3/4015* (2024.01)
  *G06T 5/94* (2024.01)
  *G06T 7/13* (2017.01)

(52) U.S. Cl.
  CPC ............. *G06T 3/4015* (2013.01); *G06T 5/94* (2024.01); *G06T 7/13* (2017.01); *G06T 2207/10024* (2013.01); *G06T 2207/20084* (2013.01)

(58) Field of Classification Search
  None
  See application file for complete search history.

(56) References Cited

U.S. PATENT DOCUMENTS

| 10,546,211 | B2 * | 1/2020 | Shacham | G06F 9/3885 |
| 11,010,873 | B2 * | 5/2021 | Smirnov | G06T 3/40 |
| 2008/0253681 | A1 * | 10/2008 | Chesnokov | G06T 5/94 |
| | | | | 382/274 |
| 2009/0257093 | A1 * | 10/2009 | Kawabe | H04N 1/40075 |
| | | | | 358/3.06 |
| 2013/0222652 | A1 * | 8/2013 | Akeley | H04N 25/134 |
| | | | | 348/241 |
| 2018/0005074 | A1 * | 1/2018 | Shacham | G06F 9/3001 |
| 2019/0354568 | A1 * | 11/2019 | Lindberg | H03H 17/028 |
| 2020/0273151 | A1 * | 8/2020 | Smirnov | G06T 5/20 |
| 2021/0211118 | A1 * | 7/2021 | Rohde | H03H 17/06 |
| 2023/0032323 | A1 * | 2/2023 | Novikov | G06T 7/13 |

FOREIGN PATENT DOCUMENTS

GB    2588674 A    5/2021

OTHER PUBLICATIONS

Mukherje et al., "False Color Suppression in Demosaiced Color Images", Indian Conference on Computer Vision, Graphics and Image Processing (ICVGIP), Dec. 16, 2004.

* cited by examiner

*Primary Examiner* — Tsung Yin Tsai
(74) *Attorney, Agent, or Firm* — EIP US LLP (57) ABSTRACT

An image processing method including obtaining image data. The image data includes a plurality of image data values. The image processing method also includes processing the image data, thereby generating output data. Processing the image data includes applying a convolution operation to the plurality of image data values using a kernel including a plurality of coefficients. Applying the convolution operation includes obtaining a sum of image data values of the plurality of image data values that correspond respectively to coefficients of the plurality of coefficients that each have a common coefficient value. Applying the convolution operation also includes multiplying the sum by the common coefficient value.

17 Claims, 7 Drawing Sheets

IMAGE PROCESSING METHOD AND SYSTEM

BACKGROUND

Technical Field

The present disclosure relates to an image processing method and system

Description of the Related Technology

Convolution operations may be performed when processing image data for a range of image processing purposes, including blurring, sharpening, demosaicing, embossing, edge detection, and more. Convolution operations may be performed using image processing systems including microprocessors such as central processing units (CPUs), graphics processing units (GPUs), and neural processing units (NPUs) for example. It is desirable to improve the efficiency with which image processing systems perform convolution operations.

SUMMARY

According to a first aspect of the present disclosure, there is provided an image processing method, comprising: obtaining image data, the image data comprising a plurality of image data values; and processing the image data, thereby generating output data, wherein processing the image data comprises applying a convolution operation to the plurality of image data values using a kernel comprising a plurality of coefficients, wherein applying the convolution operation comprises: obtaining a sum of image data values of the plurality of image data values that correspond respectively to coefficients of the plurality of coefficients that each have a common coefficient value; and multiplying the sum by the common coefficient value.

According to a second aspect of the present disclosure, there is provided an image processing system, comprising: storage for storing a plurality of coefficients; and at least one processor to: obtain image data, the image data comprising a plurality of image data values; and process the image data, thereby generating output data, wherein processing the image data comprises applying a convolution operation to the plurality of image data values using a kernel comprising the plurality of coefficients, wherein applying the convolution operation comprises: obtaining a sum of image data values of the plurality of image data values that correspond respectively to coefficients of the plurality of coefficients that each have a common coefficient value; and multiplying the sum by the common coefficient value.

BRIEF DESCRIPTION OF THE DRAWINGS

Further features will become apparent from the following description, given by way of example only, which is made with reference to the accompanying drawings.

DETAILED DESCRIPTION

Details of systems and methods according to examples will become apparent from the following description, with reference to the Figures. In this description, for the purpose of explanation, numerous specific details of certain examples are set forth. Reference in the specification to "an example" or similar language means that a particular feature, structure, or characteristic described in connection with the example is included in at least that one example, but not necessarily in other examples. It should further be noted that certain examples are described schematically with certain features omitted and/or necessarily simplified for ease of explanation and understanding of the concepts underlying the examples.

In examples herein, image data is obtained, the image data including a plurality of image data values. The image data is processed, thereby generating output data. Processing the image data includes applying a convolution operation to the plurality of image data values using a kernel, the kernel including a plurality of coefficients. Applying the convolution includes obtaining a sum of image data values of the plurality of image data values that correspond respectively to coefficients of the plurality of coefficients that each have a common coefficient value. Applying the convolution operation also includes multiplying the sum by the common coefficient value. This approach for example reduces a number of multiplication operations required to perform a convolution operation. In this way, a number of multipliers required for an image processing system to perform a convolution operation may be reduced. This approach can also reduce an amount of storage required for an image processing system to perform convolution operations because fewer coefficients of the kernel require storage. This approach can therefore improve the efficiency with which an image processing system performs convolution operations.

Figure 1:
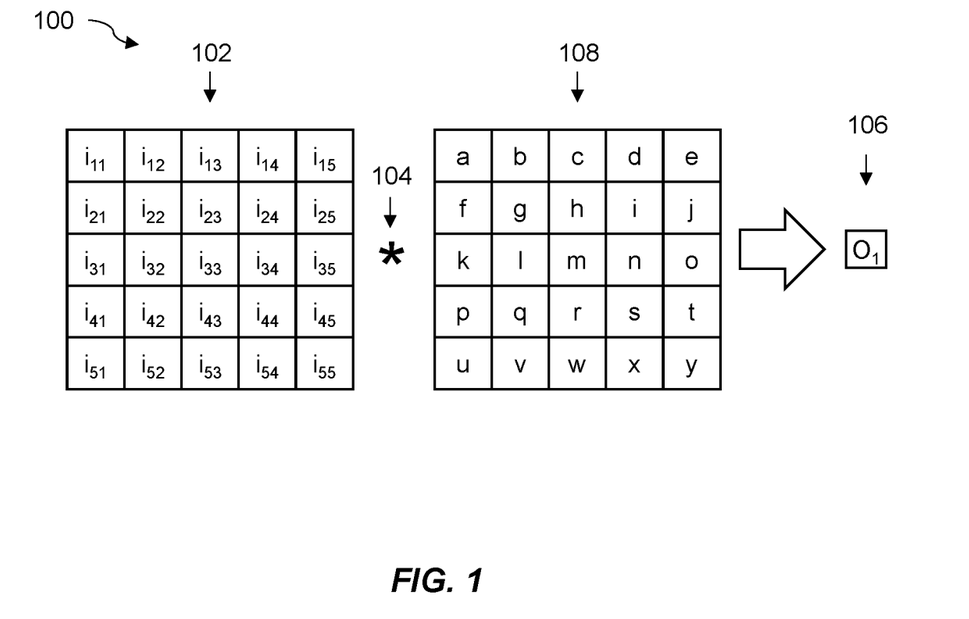
FIG. 1 is a schematic diagram showing a method of processing image data including applying a convolution operation according to examples.

FIG. 1 is a schematic diagram showing a method 100 of processing image data 102 including applying a convolution operation 104. The method 100 includes obtaining the image data 102, the image data 102 including a plurality of image data values $i_{11}$-$i_{55}$. In FIG. 1, the plurality of image data values $i_{11}$-$i_{55}$ are arranged as a 5×5 array, each image data value corresponding to a pixel location of an image represented by the image data 102. The plurality of image data values $i_{11}$-$i_{55}$ may represent at least a portion of an image such that the image includes an array of image data values which is larger than a 5×5 array. The plurality of image data values $i_{11}$-$i_{55}$ may for example be a plurality of pixel intensity values.

The image data 102 may represent at least a portion of an image captured by an image sensor. Image sensors for capturing images may be present in devices such as digital cameras, mobile phone cameras, and other image capture devices. Image sensors used to capture images may comprise an array of sensor elements, which may be called sensor pixels. The sensor pixels may comprise a photosensitive element, for example a photodiode that can convert incident light into electronic signals or data. The sensor pixels may comprise any photosensor suitable for capturing images. Further examples of sensor pixel photosensitive elements include charged-coupled devices (CCDs), or complementary metal-oxide semiconductors (CMOSs). When capturing images, the image sensor is exposed to incident light for a predetermined period of time. During this exposure, incident photons are converted into electrons by the photosensor and the charge may be stored by a capacitor. Each sensor pixel may comprise a capacitor to store the charge generated by the respective photosensor. Each sensor pixel may further comprise circuitry configured to measure the charge stored by the capacitor and to convert the amount of charge stored to a digital value. This digital value may be called a pixel intensity value. In this way, the pixel intensity value for example represents at least one characteristic of light captured by an image sensor. Each pixel intensity value may be representative of an intensity of the light captured by each sensor pixel, where the intensity of light is proportional to the number of photons captured by that sensor pixel. Each pixel intensity value may represent a luminance of captured light, which is for example a measure of the intensity of light per unit area rather than absolute intensity. In other examples, each pixel intensity value may be representative of a brightness of captured light, which may be considered to correspond to a perception of luminance, which may or may not be proportional to luminance. Each pixel intensity value may be representative of any photometric quantity or characteristic that may be used to represent the visual appearance of the image represented by the image data 102. The image data 102 may be in any suitable format, for example raw image format. The image data 102 may be obtained, for processing as part of the method 100 of FIG. 1, directly or indirectly from an image sensor, or may alternatively be obtained directly or indirectly from a separate data processing system which has rendered the image represented by the image data 102.

In the method 100 of FIG. 1, the image data 102 is processed, thereby generating output data 106. In this example, the output data 108 includes an output data value $O_1$. Processing the image data 102 includes applying the convolution operation 104 to the plurality of image data values $i_{11}$-$i_{55}$ using a kernel 108. The kernel 108 comprises a plurality of coefficients a-y. A kernel may sometimes be referred to as a "filter kernel" or a "filter" and coefficients may sometimes be referred to as "weights". In some examples, the plurality of coefficients a-y are predetermined specifically for an image processing purpose to be carried out by the convolution operation 104, such as edge detection or demosaicing for example. In other examples, such as in cases where the convolution operation 104 is applied to implement at least part of a neural network architecture, the plurality of coefficients a-y are learned during a training phase used to obtain the neural network architecture (which is for example a trained neural network architecture). In the example of FIG. 1, each of the plurality of coefficients a-y has a different respective coefficient value, e.g. a different numerical value.

In the method 100 of FIG. 1, performing the convolution operation 104 includes performing a multiply-accumulate (MAC) operation in which each coefficient of the plurality of coefficients a-y is multiplied by a corresponding image data value of the plurality of image data values $i_{11}$-$i_{55}$, and the resulting products are summed to generate the output data value $O_1$. It is to be understood that in examples where the plurality of image data values $i_{11}$-$i_{55}$ represent a portion of an image represented by the image data 102, an output data array comprising a plurality of output data values may be generated by performing the MAC operation for each of a predetermined set of positions of the kernel 108 relative to the array of image data values that the image is comprised of. In this case, the predetermined positions may be separated by a fixed number of image data values, referred to as a stride, in each plane direction of the array.

In the method 100 of FIG. 1, the convolution operation 104 involves 25 MAC operations to derive the output data value $O_1$. On this basis, applying the convolution operation 104 requires an image processing system to perform 25 multiplication operations, that is, a multiplication of each coefficient of the plurality of coefficients a-y with a corresponding image data value of the plurality of image data values $i_{11}$-$i_{55}$, e.g. with the same relative position in the portion of the image represented by the image data 102 and in the kernel 108. For example, in FIG. 1, applying the convolution operation 104 involves multiplying the image data value $i_{11}$ by the coefficient a because the image data value $i_{11}$ and the coefficient a are each located in the same relative position (the top left position) in the portion of the image represented by the image data 102 and in the kernel 108, respectively. The image processing system of FIG. 1 uses 25 multipliers to perform the convolution operation 104, to multiply each of the plurality of coefficients a-y with a corresponding image data value $i_{11}$-$i_{55}$. The image processing system hence requires storage sufficient to store the 25 coefficients of the plurality of coefficients a-y.

Examples described herein relate to improving the efficiency with which an image processing system performs convolution operations by reducing a number of multipliers and an amount of storage space required to generate an output data value. Although the examples herein are explained with reference to a 5×5 kernel, it is to be understood that the examples described herein may be used with a kernel of various other sizes, shapes and/or dimensionalities.

Figure 2:
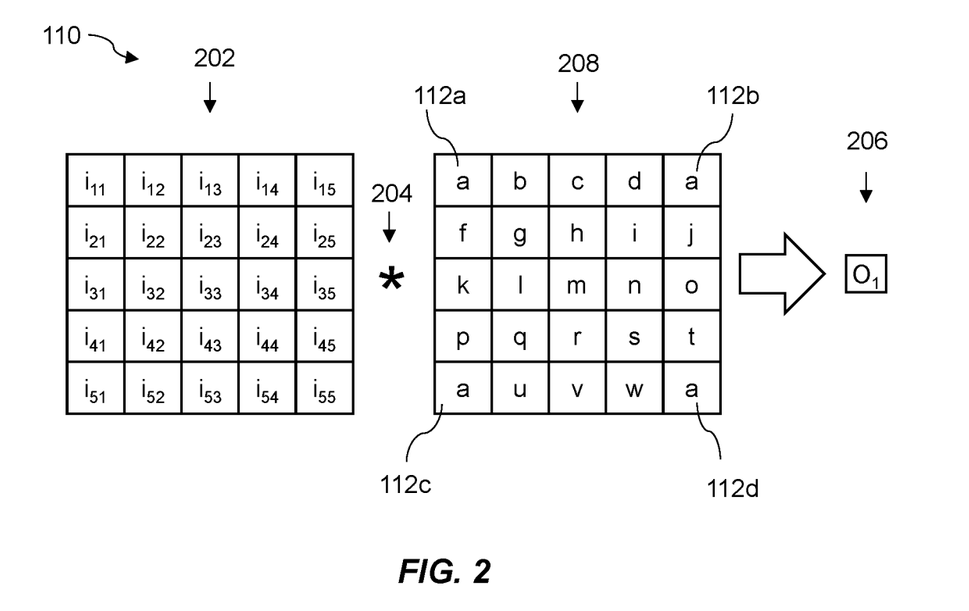
FIG. 2 is a schematic diagram showing a method of processing image data including applying a convolution operation according to further examples.

FIG. 2 is a schematic diagram showing a method 110 of processing image data 202 including applying a convolution operation 204 using a kernel 208. Features of FIG. 2 similar to corresponding features of FIG. 1 are labelled with the same reference numeral but incremented by 100; corresponding descriptions are to be taken to apply.

In this example, the method 110 includes obtaining image data 202 which includes the plurality of image data values $i_{11}$-$i_{55}$. In the method 110 of FIG. 2, the image data 202 is processed, thereby generating output data 206 which includes the output data value $O_1$. Processing the image data 202 includes applying a convolution operation 204 to the plurality of image data values $i_{11}$-$i_{55}$ using the kernel 208, which includes a plurality of coefficients. In this example, coefficients 112a-112d of the plurality of coefficients each have a common coefficient value a. The coefficient values (in this case, that each of the coefficients 112a-112d have the same coefficient value a) may be predetermined (e.g. pre-selected) or may alternatively be determined based on processing of other data. For example, in cases where the convolution operation 204 is applied to implement at least part of a neural network architecture, the coefficient values of the coefficients 112a-112d may be learned during a machine learning training phase of a machine learning process. Furthermore, it is to be understood that it may be different coefficients of the plurality of coefficients of the kernel 208 than the coefficients 112a-112d that each have the common coefficient value a and that, in other examples, a number of coefficients that each have the common coefficient value a may differ from the four coefficients 112a-112d shown in the kernel 208 of FIG. 2.

Applying the convolution operation 204 includes obtaining a sum of image data values of the plurality of image data values $i_{11}$-$i_{55}$ that correspond respectively to the coefficients 112a-112d of the plurality of coefficients that each have the common coefficient value a. In the example of FIG. 2, this corresponds to obtaining a sum of the image data values $i_{11}$, $i_{15}$, $i_{51}$ and $i_{55}$. The convolution operation 112 also includes multiplying the sum by the common coefficient value a. In the method 110 of FIG. 2, applying the convolution operation 204 may also include multiplication of each remaining coefficient b-w with the corresponding image data value of the plurality of image data values $i_{11}$-$i_{55}$. The resulting products may be summed together, and further added to the result of multiplying the sum of the image data values $i_{11}$, $i_{15}$, $i_{51}$ and $i_{55}$ by the common coefficient value a, to generate the output data value $O_1$.

In this way, the number of multiplication operations involved in the method 110 of FIG. 2 is 22, which is fewer than the 25 multiplication operations involved in the method 100 of FIG. 1. In addition, an image processing system for performing the method 110 of FIG. 2, described below with reference to FIG. 11, only requires storage for 22 coefficients rather than 25 coefficients. As explained above, this reduces a number of multipliers and an amount of storage space for an image processing system to generate the output data value $O_1$, thereby improving the efficiency with which an image processing system performs convolution operations.

In some examples, the convolution operation is applied to implement at least part of a neural network architecture. For example, the convolution operation 204 applied in FIG. 2 may be applied to implement at least part of a convolutional neural network (CNN) architecture, which can be used to efficiently analyze images e.g. for image classification. CNN architectures typically include multiple convolutional layers, each of which generates a feature map via convolutions between an array of image data values and one or more kernels. Each feature map contains multiple elements, where each element is computed via a series of MAC operations between image data values and respective coefficients of a kernel. Neural network architectures may also comprise other layer types, for example, Fully Connected (FC) layers, Deconvolution layers, Recurrent layers, and so forth.

Figure 3:
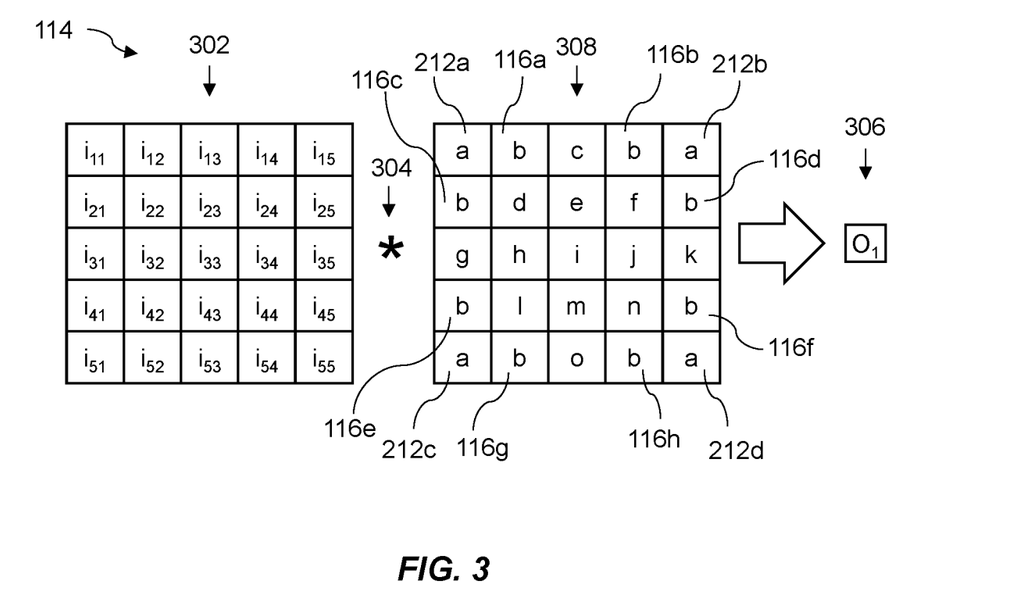
FIG. 3 is a schematic diagram showing a method of processing image data including applying a convolution operation according to further examples.

FIG. 3 is a schematic diagram showing a method 114 of processing image data 302 including applying a convolution operation 304 using a kernel 308. Features of FIG. 3 similar to corresponding features of FIG. 2 are labelled with the same reference numeral but incremented by 100; corresponding descriptions are to be taken to apply. In this example, the common coefficient value a is a first common coefficient value and the sum of image data values $i_{11}$, $i_{15}$, $i_{51}$ and $i_{55}$ is a first sum. In addition, further coefficients 116a-116h of the plurality of coefficients each have a second common coefficient value b, which is different from the first common coefficient value a. Similarly to the coefficients 212a-212d of the plurality of coefficients that each have the first common coefficient value a as described above, it is to be understood that it may be different coefficients of the plurality of coefficients of the kernel 308 than the further coefficients 116a-116h that each have the second common coefficient value b and that, in other examples, a number of coefficients that each have the second common coefficient value b may differ from the eight coefficients 116a-116h shown in the kernel 308 of FIG. 3.

In the method 114 of FIG. 3, the image data 302 is processed, thereby generating output data 306 which includes the output data value $O_1$. Processing the image data 302 includes applying the convolution operation 304 to the plurality of image data values $i_{11}$-$i_{55}$ using the kernel 308. In the method of FIG. 3, applying the convolution operation 304 includes obtaining a second sum of image data values of the plurality of image data values $i_{11}$-$i_{55}$ that correspond respectively to the further coefficients. In the example of FIG. 3, this corresponds to obtaining a sum of the image data values $i_{12}$, $i_{14}$, $i_{21}$, $i_{25}$, $i_{41}$, $i_{45}$, $i_{52}$ and $i_{54}$ as the second sum. The convolution operation 304 also includes multiplying the second sum by the second common coefficient value b. In the method 114 of FIG. 3, applying the convolution operation 304 may also include multiplication of each remaining coefficient c-o with the corresponding image data value of the plurality of image data values $i_{11}$-$i_{55}$. The resulting products may be summed together, and further added to the result of multiplying the sum of the image data values $i_{11}$, $i_{15}$, $i_{51}$ and $i_{55}$ by the common coefficient value a, and the result of multiplying the second sum by the second common coefficient value b, to generate the output data value $O_1$.

In this way, the number of multiplication operations involved in the method 114 of FIG. 3 is 15, showing a further reduction compared to the 25 multiplication operations involved in the method 100 of FIG. 1. In addition, an image processing system for performing the method 114 of FIG. 3 only requires storage for 15 coefficients rather than 25 coefficients. As explained above, this further reduces a number of multipliers and an amount of storage space for an image processing system to generate the output data value $O_1$, thereby further improving the efficiency with which an image processing system performs convolution operations.

Figure 4:
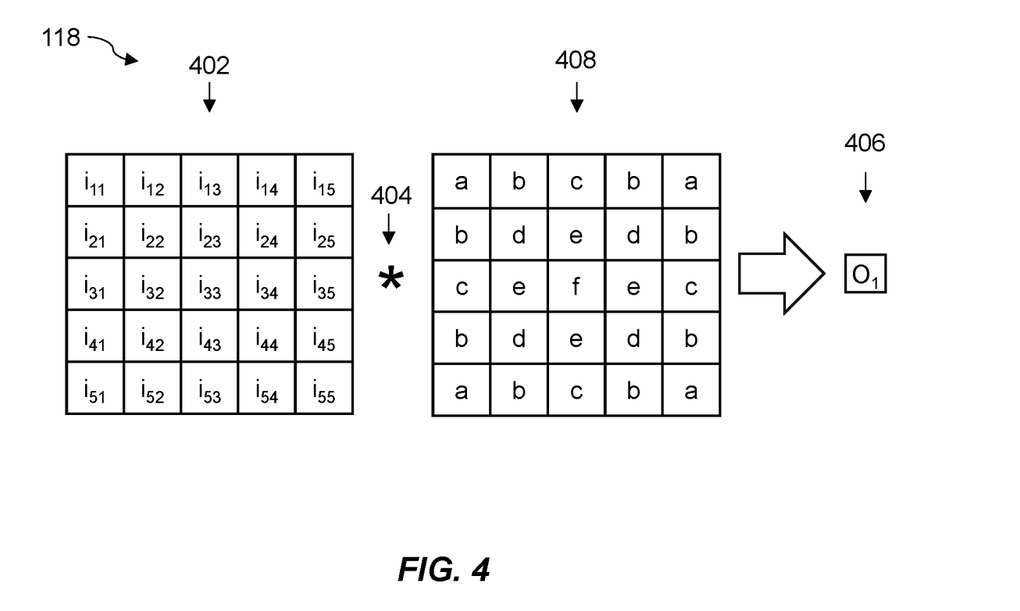
FIG. 4 is a schematic diagram showing a method of processing image data including applying a convolution operation according to further examples.

FIG. 4 is a schematic diagram showing a method 118 of processing image data 402 thereby generating output data 406, the processing including applying a convolution operation 404 using a kernel 408. Features of FIG. 4 similar to corresponding features of FIG. 3 are labelled with the same reference numeral but incremented by 100; corresponding descriptions are taken to apply.

In this example, the kernel 408 is symmetric. A symmetric kernel may be described generally as a kernel having at least one line of reflective symmetry, such as a kernel comprising an array of coefficients, each coefficient given by $K_{i,j}$, where i is a row number of the array of coefficients and j is a column number of the array of coefficients, for which $K_{i,j}=K_{j,i}$. This expression represents one line of reflective symmetry of the kernel. However, the kernel 408 in this example includes four such lines of reflective symmetry such that the coefficients $K_{i,j}$ of the kernel 408 also satisfy $K_{i,j}=K_{(N-j+1),(N-i+1)}$ and $K_{i,j}=K_{(N-i+1),j}$ where N represents the size of the kernel 408 (i.e. N=5 in this case). There may be a predetermined constraint on the kernel 408 to be symmetric using the three expressions above for coefficients $K_{i,j}$ (e.g. with the coefficient values pre-selected so that the kernel 408 is symmetric) or there may be no such predetermined constraint on the kernel 408. For example, in cases where the convolution operation 404 is applied to implement at least part of a neural network architecture, the coefficient values of the kernel 408 may be learned during a machine learning training phase.

It can be seen that the kernel 408 may be represented by six common coefficient values a, b, c, d, e and f, each of which is different from each other. Applying the techniques described above with reference to FIG. 2 and FIG. 3, the number of multiplication operations involved in the method 118 of FIG. 4 is six, showing an even further reduction compared to the 25 multiplication operations involved in the method 100 of FIG. 1. In addition, an image processing system for performing the method 118 of FIG. 4 only requires storage for six coefficients rather than 25 coefficients. As explained above, this still further reduces a number of multipliers and an amount of storage space for an image processing system to generate the output data value $O_1$, thereby yet further improving the efficiency with which an image processing system performs convolution operations. It is to be understood that in other examples, not all three expressions may be used to define the coefficients $K_{i,j}$ of the kernel, and hence a kernel according to examples described herein may include at least one, but less than four lines of reflective symmetry. This still reduces the number of multiplication operations required to apply the convolution operation, and the storage requirements for an image processing system compared to the method 100 of FIG. 1.

Figure 5:
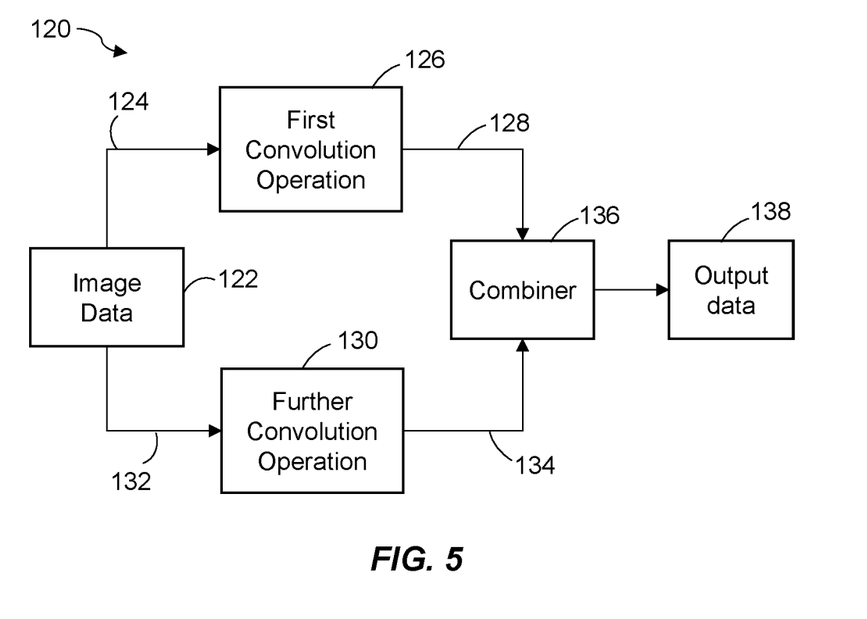
FIG. 5 is a schematic diagram showing a method of processing image data including applying a further convolution operation according to examples.

FIG. 5 is a schematic diagram showing a method 120 of processing image data 122 which includes a plurality of image data values 124. In the method 120 of FIG. 5, processing the image data 122 includes applying a first convolution operation 126 to the plurality of image data values 124, thereby generating an output 128. In this example, the first convolution operation 126 may be one of the convolution operations 204, 304, 404 of FIG. 2, 3 or 4. The output 128 of the first convolution operation 126 may therefore include one of the output data values 206, 306, 406 of FIG. 2, 3 or 4. In the method 120 of FIG. 5, the first convolution operation 126 is applied as part of a demosaicing algorithm applied to the image data 122. However, it is to be appreciated that the method 120 of FIG. 5 may be applied in examples where the first convolution operation 126 is applied for a different purpose. Demosaicing for example, allows for an image data value for each color channel to be obtained for each pixel location as described in more detail below with reference to FIGS. 8 and 9. In this example, a Bayer filter array is used to capture the image, and so the output 128 includes an array of output data values which, for each pixel location of the image, represent an image data value for each of the red, green and blue color channels.

The method 120 of FIG. 5 also includes applying a further convolution operation 130 to at least some 132 of the plurality of image data values 124 using a further kernel, thereby generating a further output 134. In this example, the further kernel used in the further convolution operation 130 represents a bandpass filter for edge detection. The bandpass filter may be used to suppress low- and high-frequency components of an image represented by the at least some 132 of the plurality of image data values 124. For example, lower-frequency components may not provide sufficient information regarding a contrast of the image. Conversely, high-frequency components may be sensitive to high-contrast image features, and hence may be subject to noise. Coefficients of the further kernel to perform the further convolution 130 may be predetermined. In this way the bandpass filter may be tuned such that coefficients of the further kernel determine frequencies of the low- and high-frequency components of the image that are suppressed by the further convolution operation 130. Alternatively, in cases where the further convolution operation is applied to implement at least part of a neural network architecture, coefficients of the further kernel may be learned during a training phase of the neural network. Alternatively, coefficients of the further kernel may be derived as part of an automated tuning process of an image signal processing system, such as the image processing system described below with reference to FIG. 10. It is to be understood that the further convolution operation 130 may utilize any of the above-described methods 110, 114, 118 of FIG. 2, 3 or 4 in order to reduce a number of multiplication operations required by an image processing system to perform the further convolution operation 130. In this example, the further output 134 includes a grayscale image showing the edges detected in the image by applying the further convolution operation 130, as described in more detail below. In this case, the grayscale image may include an array of image data values of the same size as the array of output data values of the output 128.

In the method 120 of FIG. 5, a combiner 136 combines the output 128 of the first convolution operation 126 with the further output 134 of the further convolution operation 130, thereby generating the output data 138. In this way, the output data 138 includes a combination of information regarding edges detected in the image by applying the further convolution operation 130 and information obtained from the first convolution operation 126 applied to the plurality of image data values 124. For example, the combiner 136, for a given pixel location, combines an image data value of the grayscale image from the further output 134 of the further convolution operation 130 with each of the image data values for each of the red, green and blue color channels from the output 128 of the first convolution operation 126. This may include adding the image data value of the grayscale image to each of the image data values for each of the red, green and blue color channels. By combining both the output 128 of the first convolution operation 126 and the further output 134 of the further convolution operation 130, the output data 138 in this example includes information regarding detected edges in the image represented by the image data 122, and the amount of noise in the image is also reduced. In this example where the first convolution operation 126 is used as part of a demosaicing algorithm, the output data 138 includes an array of output data values which for each pixel location of the image, represents an image data value for each the red, green and blue color channels, with additional information regarding detected edges in the image represented by the image data 122. In this way, an output image represented by the output data 138 may provide a sharper image around the detected edges.

In some examples, the plurality of image data values 124 are associated with a plurality of pixel locations, respectively. For example, as shown above in FIGS. 1-4, each of the plurality of image data values $i_{11}$-$i_{55}$ may relate to a respective pixel location in the image represented by the image data 122. In some examples each pixel location of the image is associated with a respective color channel. For example, an image sensor used to capture an image may comprise a color filter array. A color filter array may comprise an array of color filter elements arranged in a predetermined pattern. Each color filter element may correspond to a respective sensor pixel of the image sensor. The predetermined pattern may be considered to form a mosaic or a repeating pattern. A color filter element may allow light of a particular color to pass through and be received by a corresponding sensor pixel. A color filter may also prevent light of certain colors from being passed through to the corresponding sensor pixel. A color may refer to any range of wavelengths of light. For example, a clear, or white, filter element which passes substantially all (e.g. at least 90%) of the received light through may still be considered a color filter element. In other examples, colors may have narrower wavelength ranges and may include, for example, green, blue, and red. In this way, the color filter array may allow different sensor pixels of an array of sensor pixels to receive different colors of incident light. Pixel locations of the image may each be associated with a single color. A specific example of a color filter pattern is a Bayer filter pattern. A Bayer filter pattern is composed of a combination of 2×2 pixel arrays of red, green, green and blue filter elements, typically with one red filter element, two green filter elements (generally on different rows and columns to each other) and one blue filter element. However, it is to be appreciated that examples described herein may relate to other color filter patterns, such as a combination of 2×2 pixel arrays of red, white, white and blue filter elements, for example. In examples where each pixel location is associated with a single color channel, the first convolution operation 126 may form at least part of a demosaicing algorithm within an image processing pipeline. Demosaicing for example allows for an image data value for each color channel to be obtained for each pixel location. For example, for an image sensor comprising a Bayer filter array that captures an image, a pixel location may be associated with a red color channel, and demosaicing may allow for image data values for the green and blue channels to be obtained for that pixel location. Demosaicing for example involves interpolating between adjacent pixels of the same color channel to obtain an image data value at a location between these adjacent pixels, such as at a location corresponding to a pixel of a different color channel. This may be performed for each of a plurality of color channels in order to obtain, at each pixel location, an image data value for each of the color channels. In some cases, gray scale demosaicing may be performed, in which a grayscale intensity is obtained at each pixel location indicating an image data value for a single color channel (e.g. from white (lightest) to black (darkest)). An example image processing pipeline including a demosaicing algorithm is described below with reference to FIG. 7.

In an example, each pixel location is associated with one of a first color channel and a further color channel. For example, where a color filter pattern is a Bayer filter pattern, the first color channel may be a red color channel and the further color channel may be a green color channel. The processing of FIG. 5 may be applied to such an example. In this case, the further convolution operation 130 of FIG. 5 is applied to some 132 of the plurality of image data values 124. The further convolution operation 130 may be such that the further output 134 comprises equal contributions from pixel locations associated with the first color channel and pixel locations associated with the further color channel, independent of a pixel location associated with a respective image data value to which the further convolution operation 130 is applied. A respective image data value to which a convolution operation is to be applied may be understood as the image data value associated with a central pixel location that corresponds with a central coefficient (sometimes referred to as an 'anchor point') of the kernel. For example, for the convolution operations 104, 204, 304, 404 of FIGS. 1, 2, 3 and 4, the central pixel location is associated with the image data value $i_{33}$ as this corresponds with coefficient f, which is the central coefficient of kernels 108, 208, 308, 408 of FIGS. 1, 2, 3 and 4. On this basis, the convolution operations 104, 204, 304, 404 of FIGS. 1, 2, 3 and 4 are deemed to be applied at the image data value $i_{33}$. In this example, if the further convolution operation 130 is applied at a pixel location associated with a first color channel (e.g. a red color channel), the further output 134 will include equal contributions from pixel locations associated with the first color channel and the further color channel. A similar situation will apply if the further convolution operation 130 is applied at a pixel location associated with the further color channel (e.g. the green color channel), and similarly if the further convolution operation 130 is applied at a pixel location associated with a yet further color channel (e.g. a blue color channel). Coefficients of the further kernel used to apply the further convolution operation 130 may be such that the bandpass filter detects edges in the image represented by the image data 122, but suppresses the high-frequency Bayer pattern component. This for example means that edges detected in the image by applying the further convolution operation represent edges of a scene represented by the image, and not high-frequency edges resulting from a color filter pattern of the color filter array.

In this way, in examples where a Bayer filter array is used to capture the image, a color of the further output 134 may be grayscale because, independent of a central pixel location to which the further convolution operation 130 is applied (i.e. independent of whether the central pixel location is associated with a red, green or blue color channel), the further output 134 includes equal contributions from pixel locations associated with each of the red, green and blue color channels. Combining the grayscale image with the image data values for each of the red, green and blue color channels, derived from demosaicing the image data 122, may effectively desaturate the image around the detected edges, which may reduce a chance of false colors being present around edges in the output data 138. False colors, also sometimes referred to as colored artifacts, may occur when performing convolution operations that combine contributions from image data values associated with different color channels, as an output of such a convolution operation may be an image data value that differs significantly from an original image data value at the same pixel location representing the actual color of the scene represented by the image. This difference may be visually noticeable in an output image as a color not present in an original input image. False colors may hence appear as erroneous to a viewer, so it is desirable for their presence to be reduced, e.g. by performing the further convolution operation 130.

In a case where the color filter pattern is a Bayer filter pattern, the further kernel used to apply the further convolution operation 130 may be referred to as a "Bayer invariant kernel". The further output 134 in this example will include equal contributions from pixel locations associated with the red, blue and green color channels, independent of a pixel location to which the further convolution operation 130 is applied. An example of a Bayer invariant 3×3 kernel is:

$$\begin{pmatrix} 1 & 2 & 1 \\ 2 & 4 & 2 \\ 1 & 2 & 1 \end{pmatrix}.$$

However, this is not intended to be limiting, as many other Bayer invariant kernels of a different size, shape and/or dimensionality are possible.

Figure 6:
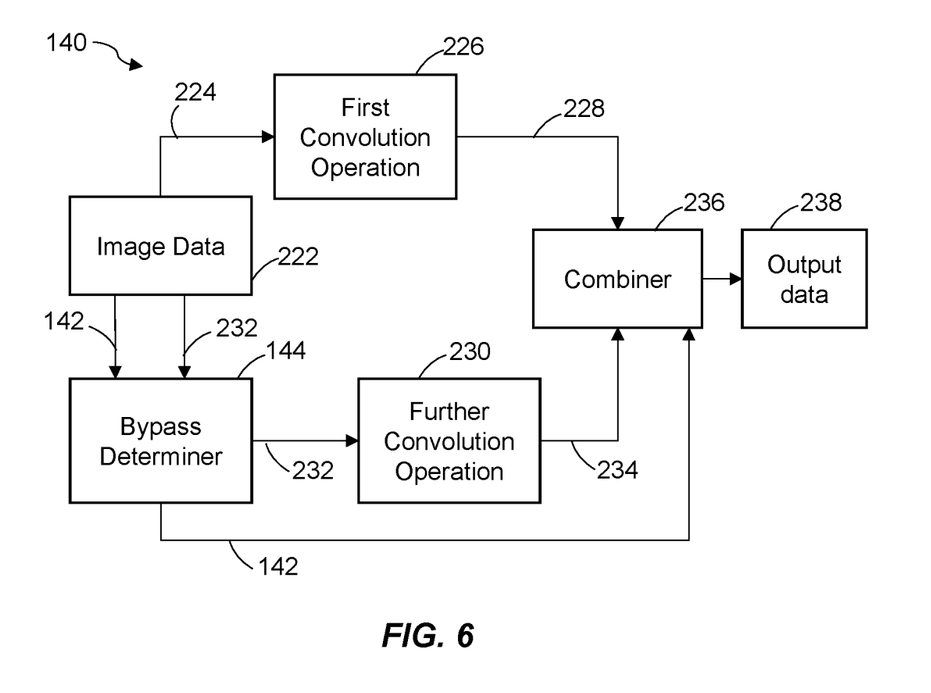
FIG. 6 is a schematic diagram showing a method of processing image data including applying a further convolution operation according to examples.

FIG. 6 is a schematic diagram showing a method 140 of processing image data 222 which includes a plurality of image data values 224. Features of FIG. 6 similar to corresponding features of FIG. 5 are labelled with the same reference numeral but incremented by 100; corresponding descriptions are taken to apply.

In this example, the image data values 232 of the plurality of image data values 224 that are processed using the further convolution operation 230 are a first set of the plurality of image data values 232 and the image data also includes a second, different set of the plurality of image data values 142. The method 140 of FIG. 6 includes a bypass determiner 144, which determines whether to bypass applying the further convolution operation 230 to the image data values 232. In this case, the bypass determiner 144 determines to bypass applying the further convolution operation 230 to at least the second set of the plurality of image data values 142. In this way, the bypass determiner 144 determines to apply the further convolution operation 230 to chosen image data values of the plurality of image data values (e.g. to the first set of the plurality of image data values 232), which may correspond to applying the bandpass filter for edge detection to determined regions of the image represented by the image data 222. In some examples, performing the above-mentioned determining for the second set of the plurality of image data values 142 may come at a cost of not detecting edges for this part of the image represented by the second set of the plurality of image data values 142. However, the bypass determiner 144 may determine that if the further convolution operation 230 were to be applied to the second set of the plurality of image data values 142, there would be a chance, for example a probability above an acceptable probability threshold, that the further convolution operation 230 would detect false edges or other image artifacts in the image. As such, if this output were to be combined, by the combiner 236, with the output 228 of the first convolution operation 226 and the further output 234 of the further convolution operation 230, the output data 238 may include false edges, or other undesirable image artifacts. In such examples, it may be preferable to bypass applying the further convolution 230 to the second set of the plurality of image data values 142.

This determining may be based on properties of the image data 222. In one example, the bypass determiner 144 performs the above-mentioned determining based on an amount of information related to at least one color channel in the second set of the plurality of image data values 142. For example, the bypass determiner 144 may determine that there is not enough information related to the at least one color channel in the second set of the plurality of image data values 142 to apply the further convolution operation 230 without generating an undesirable level of false edges or other image artifacts. In FIG. 6, if the amount of information related to the at least one color channel in the second set of the plurality of image data values 142 is less than an amount of information related to the at least one color channel in the first some of the plurality of image data values 232, e.g. by amount that satisfies a particular information condition, the bypass determiner 144 determines to apply the further convolution operation 230 to the first set of the plurality of image data values 232, but to bypass the application of the further convolution operation 230 to the second set of the plurality of image data values 142. In this way, the further convolution operation 230 may be applied selectively to different parts of an image represented by the image data 222.

In an example where a Bayer filter array is used to capture the image represented by the image data 222, the bypass determiner 144 may be configured apply a mask, M, at each pixel location in the image, given by the formula:

$$M = 1 - \text{clip}((\max(R,B) - dm_{ratio} * G - dm_{offset}) * dm_{strength}, 0, 1),$$

where R, B and G are image data values associated with the red, blue and green color channels respectively and may for example be obtained by demosaicing the image data 222 as described above, $dm_{ratio}$ is a threshold ratio between either R and G or B and G which can be used to determine whether there is enough information related to the color channels 142 to apply the further convolution operation 230 without generating an undesirable level of false edges or other image artifacts, $dm_{offset}$ is an offset tuned to determine a sensitivity of the determining, and $dm_{strength}$ represents a multiplier applied depending on a pixel intensity at the given pixel location. A value of the mask, M, is between 0 or 1, in which 1 corresponds to the bypass determiner 144 determining to bypass applying the further convolution operation 230, and 0 corresponds to the bypass determiner 144 determining to apply the further convolution operation 230. The parameters $dm_{ratio}$, $dm_{offset}$ and $dm_{strength}$ may be empirical and tuned depending on a desired sensitivity of the mask M. Alternatively, in examples where the bypass determiner 144 is applied to implement at least part of a neural network architecture, the parameters $dm_{ratio}$, $dm_{offset}$ and $dm_{strength}$ may be learned during a training phase of the neural network, which e.g. uses back-propagation. As an example to illustrate the use of the mask M, a part of an image represented by the image data 222 may include solely red text on black background. In this example, this part of image solely contains information associated with the red color channel (i.e. G=0, B=0) and so the value of the mask, M, will be 1, which corresponds to the bypass determiner 144 determining to bypass applying the further convolution operation 230. In this case, it is determined that applying the further convolution operation 230 to this part of the image will likely result in false edges being detected, and so the applying of the further convolution operation 230 is bypassed.

Figure 7:
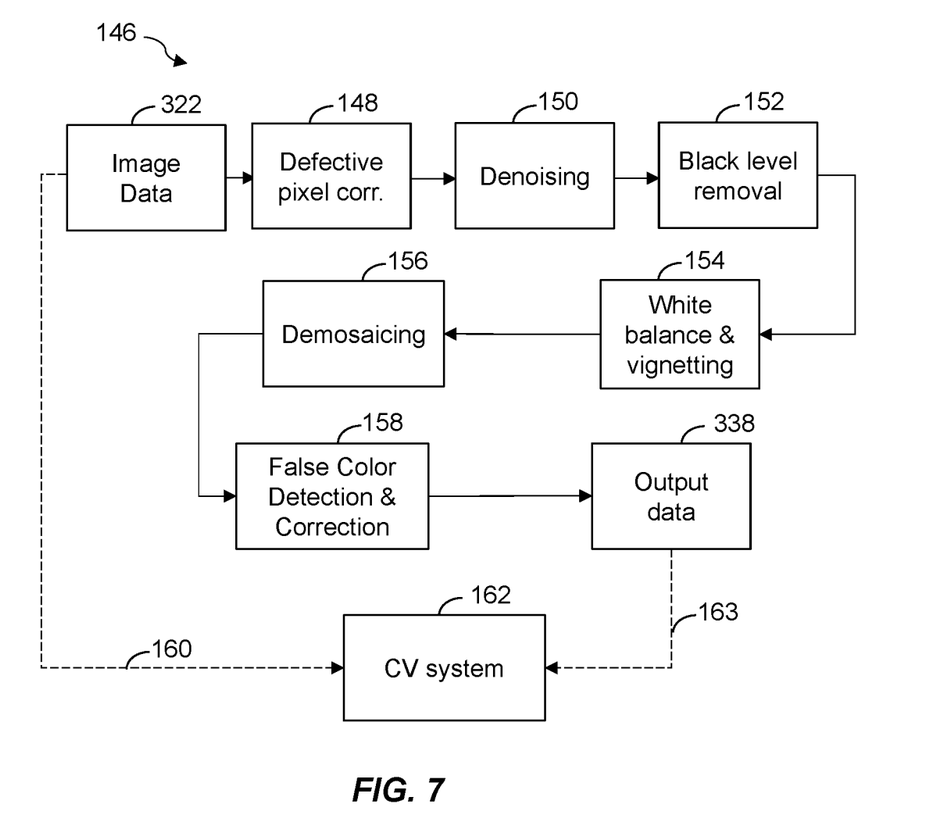
FIG. 7 is a schematic diagram showing an image processing pipeline according to examples.

FIG. 7 is a schematic diagram showing an image processing pipeline 146 for processing image data 322 to generate output data 338. In this example, applying any of the convolution operations 204, 304, 404 described above with reference to FIGS. 2, 3 and 4 forms at least part of a demosaicing algorithm within the image processing pipeline 146.

In the image processing pipeline 146 of FIG. 7, the image data 322 undergoes defective pixel correction 148. In this way, defective sensor pixels, such as those that are broken, damaged or otherwise not fully functional, can be compensated for. For example, an image data value for a defective pixel may be obtained based on image data values of at least one nearby non-defective sensor pixel. For example, such an image data value may be obtained by interpolating image data values of at least two neighboring non-defective sensor pixels.

In the image processing pipeline 146 of FIG. 7, denoising 150 is applied to the image data 322 to remove noise present in the image data 322. Noise may arise in the image data 322 from several sources. Shot noise, arising due to the quantized nature of light, may occur in the photon count of the image sensor. Dark current noise arises from small currents in the image sensor when no radiation is being received and may be dependent on environmental factors such as temperature. Read noise arises from the electronics in the image sensor and is related to the level of analogue gain used by the image sensor. At least one denoising algorithm may be applied to remove noise arising from at least one of a plurality of noise sources.

The image data values represented by the image data 322 may include pedestal values, which are for example constant values which are added to image data values to avoid negative image data values during the image capture process. For example, a sensor pixel may still register a non-zero sensor pixel value even when exposed to no light, e.g. due to noise (as discussed above). To avoid reducing the image data values to less than zero, the pedestal values may be added. Hence, before further processing is performed, the image data 322 in the image processing pipeline 146 of FIG. 7 undergoes black level removal 152 to remove the pedestal values.

In the image processing pipeline 146 of FIG. 7, white balance and vignetting 154 are performed. White balance for example involves adjusting at least some of the image data values so that the color of white, or other light or neutral-colored, objects in a scene is accurately represented. Vignetting, sometimes referred to as lens shading, is the phenomenon of the brightness or intensity of an image gradually decreasing radially away from the center of the image. Vignetting may be caused by various features of an image capture device, and may be corrected for using various algorithms.

In the image processing pipeline 146 of FIG. 7, the image data 322 is demosaiced 156. As described above, demosaicing allows for an image data value for each color channel to be obtained for each pixel location. Demosaicing is described further below, with reference to FIGS. 8 and 9. In the example of FIG. 7, applying the convolution operation to the plurality of image data values, as described above with reference to either FIG. 2, 3 or 4, forms at least part of the demosaicing algorithm 156 within the image processing pipeline 146.

In the image processing pipeline 146 of FIG. 7, the image data 322 undergoes false color detection and correction 158. In this example, performing false color detection includes detecting a region of the image comprising an image data value with a measured error exceeding a threshold. This measured error may be referred to as a false color, or colored artifact as described above. The measured error is associated with the demosaicing algorithm 156. For example, the measured error may arise due to the demosaicing algorithm 156 because an image data value for a color channel at a given pixel location obtained by interpolating between adjacent pixels of the same color channel may not always accurately depict the color of the scene represented by the image. For example, in a case where a Bayer filter array is used to capture the image represented by the image data 322, a false color may arise due to the image represented by the image data 322 including high frequency periodic information, such that the output of the demosaicing algorithm 156 includes interpolated image data values that do not always accurately capture the color of the scene. This can be visualized by considering an example of an image which includes black and white stripes at a high frequency, such that a 5×5 array of image data values for this image for example may be represented as:

$$\begin{bmatrix} 0 & 1 & 0 & 1 & 0 \\ 0 & 1 & 0 & 1 & 0 \\ 0 & 1 & 0 & 1 & 0 \\ 0 & 1 & 0 & 1 & 0 \\ 0 & 1 & 0 & 1 & 0 \end{bmatrix}$$

where 0 represents black, and 1 represents white. In this example, a corresponding 5×5 Bayer filter pattern used by an image sensor to capture the image may be shown as:

$$\begin{bmatrix} R & G & R & G & R \\ G & B & G & B & G \\ R & G & R & G & R \\ G & B & G & B & G \\ R & G & R & G & R \end{bmatrix}$$

where R represents the red filter elements, B represents the blue filter elements and G represents the green filter elements. In this case, capturing the above 5×5 image of black and white stripes using this Bayer filter pattern would generate the following 5×5 array of image data values:

$$\begin{bmatrix} 0 & G_{12} & 0 & G_{14} & 0 \\ 0 & B_{22} & 0 & B_{24} & 0 \\ 0 & G_{32} & 0 & G_{34} & 0 \\ 0 & B_{42} & 0 & B_{44} & 0 \\ 0 & G_{52} & 0 & G_{54} & 0 \end{bmatrix}$$

where $G_{ij}$ and $B_{ij}$ represent image data values associated with the green and blue color channels respectively, at a pixel location with row number i and column number j. As can be seen in this example, there is no information related to the red color channel, and information related to the green color channel has been significantly reduced compared to the originally captured image. On this basis, performing the demosaicing algorithm 156 may generate a resulting image that appears blue, which would not accurately correspond to the color of the scene represented by the original image (i.e. black and white stripes).

In this example, the measured error may be measured by using information associated with the green color channel from the image data 322 to identify high frequency regions of the image represented by the image data 322 for which false colors may be expected to occur due to the demosaicing algorithm 156. The threshold which the measured error is compared to may be predetermined to correspond to a minimum magnitude of the measured error for which false color correction is to be applied. In this example, false color correction includes processing a portion of the image data representing the region of the image to desaturate the region of the image. Saturation refers to the colorfulness of an area judged in proportion to its brightness, in which colorfulness refers to perceived chromatic nature of a color. Desaturating the region of the image may include adding shades of gray to the region of the image, thereby reducing the colorfulness of the region of the image and suppressing any false colors resulting from applying the demosaicing algorithm 156. In this way, the false color detection and correction 158 reduces a presence of false colors in the image represented by the image data 322.

It is to be appreciated that the image processing pipeline of FIG. 7 is merely an example, and other image processing pipelines may omit various steps (such as at least one of defective pixel correction 148, denoising 150, black level removal 152 and while balance and vignetting 154), may have a different order of steps and/or may include additional processing steps. For example, defective pixel correction 148 and/or denoising 150 may be applied to the image data 322 before the image data 322 is processed by an image processing pipeline. As another example, black level removal 152 may be omitted if no pedestal values are added.

In the image processing pipeline 146 of FIG. 7, the image data 322 includes green color channel data 160. For example, where a Bayer filter array is used to capture the image represented by the image data 322, the image data includes green color channel data 160 which includes green image data values (i.e. green pixel intensity values) for each pixel location in the Bayer filter array associated with the green color channel. In this case, the image data 322 will similarly include red color channel data and blue color channel data. In the image processing pipeline of FIG. 7, the green color channel data 160 is input to both the demosaicing algorithm 156 (as part of the image data 322), which processes the image data 322 as described above, and to a computer vision (CV) system 162 to implement CV functionality. CV functionality may include the processing of image data to extract relatively high-level information describing content of the image. The CV system 162 may comprise artificial neural networks (ANNs) such as convolutional neural networks (CNN) to extract this information. CV functionality may include performing object detection and/or recognition. CV functionality may include other tasks such as motion estimation, scene reconstruction or image restoration. In some examples, CV functionality includes performing simultaneous localization and mapping (SLAM). SLAM comprises generating and/or updating a map of an environment whilst simultaneously determining and/or tracking a location of a sensor within the environment. SLAM processing may involve identifying and locating objects in the environment, and using those identified objects as semantic "landmarks" to facilitate the accurate and/or efficient mapping of the environment. CV functionality may be used for various purposes, for example in the robotics or automotive industries.

Inputting the green color channel data 160 to the CV system 162 may be preferred compared to inputting interpolated values output from the demosaicing algorithm 156 to the CV system 162 because errors from the demosaicing algorithm 156, e.g. false colors or colored artifacts, may be carried forward and therefore impact on an accuracy of the CV functionality implemented by the CV system 162. In this example, however, the green color channel data 160, which may be obtained from raw image data captured by an image sensor and not derived using the demosaicing algorithm 156 for example, has a lower contribution from such false colors, thereby improving the accuracy of the CV functionality. In some examples, though, interpolated values 163 from the output data 338 may also or instead be input to the CV system 162 in addition to or instead of the green color channel data. The interpolated values 163 for example include red and blue image data values (i.e. red and blue pixel intensity values) for each pixel location in the Bayer filter array associated with the green color channel. These interpolated values 163 are obtained by performing the demosaicing algorithm 156 as described above. In this way, for each pixel location in the Bayer filter array associated with the green color channel, the CV system 162 will obtain image data values associated with each of the green, red and blue color channels. It is to be appreciated that whether to input green color channel data 160 and/or the interpolated values 163 to the CV system, may be predetermined based on the CV functionality implemented by the CV system 162. In other examples, red color channel data or blue color channel data from the image data 322 may instead be input to the CV system 162, and the interpolated values 163 in this case include image data values for the other of red or blue, and green image data values (i.e. green pixel intensity values) from the output data 338.

Figure 8:
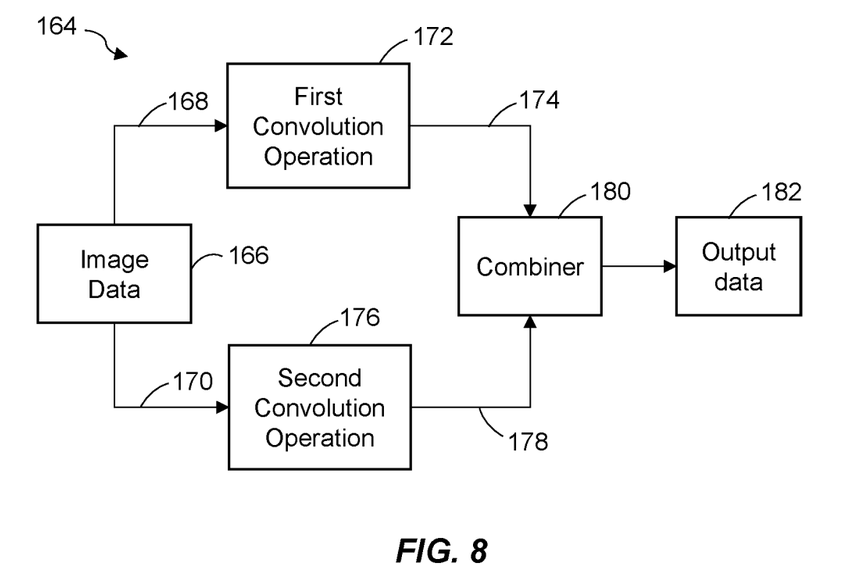
FIG. 8 is a schematic diagram showing a method of processing image data according to examples.

FIG. 8 is a schematic diagram showing a method 164 of processing image data 166. The method 164 of FIG. 8 may for example be used to perform a demosaicing algorithm to the image data 166, and may therefore be performed within the image processing pipeline 146 described above with reference to FIG. 7. In this way the method 164 of FIG. 8 may be performed for each of a first and second color channel in order to obtain, at each pixel location, an image data value for each of the color channels.

In this example, image data 166 includes a first plurality of image data values 168 associated with a first plurality of pixel locations associated with a first color channel. The image data 166 also includes a second plurality of image data values 170 associated with a corresponding second plurality of pixel locations associated with a second color channel different from the first color channel. In this example, the second plurality of pixel locations are different from the first plurality of pixel locations.

In the method 164 of FIG. 8, the first convolution operation 172 is applied to the first plurality of image data values 168 using a first kernel, thereby generating a first output 174 and the second convolution operation 176 is applied to the second plurality of image data values 170 using a second kernel, thereby generating a second output 178. In this way, the first convolution operation 172 is solely applied to image data values associated with the first color channel and the second convolution operation 176 is solely applied to image data values associated with the second color channel. It is to be understood that either or both of the first convolution operation 172 and the second convolution operation 176 may utilize any of the above-described methods 110, 114, 118 of FIG. 2, 3 or 4 in order to reduce a number of multiplication operations required by an image processing system to perform the respective convolution operations.

For the first convolution operation 172 to solely be applied to the first plurality of image data values 168 associated with the first color channel, coefficients of the first kernel may be arranged such that coefficients which corresponds with image data values associated with a different color channel (e.g. the second plurality of image data values 170 associated with the second color channel) may be set to zero. In this way, applying the first convolution operation 172 means that these image data values associated with the different color channel are multiplied by zero, and so the first output 174 solely includes contributions from the first plurality of image data values 168 associated with the first color channel. Alternatively, a dilation coefficient of the first kernel may be set such that so the first output 174 solely includes contributions from the first plurality of image data values 168 associated with the first color channel. The dilation coefficient, for example, specifies a spacing between coefficients of the first kernel, which avoids setting coefficients which coincide with image data values associated with a different color channel to zero. This means that the first convolution operation 172 solely includes multiplication operations with respect to the first plurality of image data values 168. For example, where a Bayer filter array is used to capture the image represented by the image data 166, the dilation coefficient may be set to two. Setting a dilation coefficient in this way avoids having to multiply image data values associated with the different color channel by zero, thereby reducing a number of multiplication operations performed by applying the first convolution operation 172 using the first kernel. In addition, this also reduces a number of coefficients that an image processing system must store to apply the first convolution operation 172. It is to be understood that the second kernel used to apply the second convolution operation 176 may also be configured in a similar manner.

In the method 164 of FIG. 8, for a pixel location of the second plurality of pixel locations associated with the second color channel, an image data value for the first color channel is obtained. To obtain the image data value, a combiner 180 calculates, based on the pixel location, a combination of the first output 174 with the second output 178. The combination may for example be any linear combination of the first output 174 and the second output 178. The output data 182 thereby generated includes the calculated image data value for the first color channel at the pixel location. The method 164 of FIG. 8 therefore allows, for a pixel location associated with the second color channel, an image data value associated with the first color channel to be obtained so that the output data 182 for the pixel location comprises an image data value for each color channel.

Figure 9:
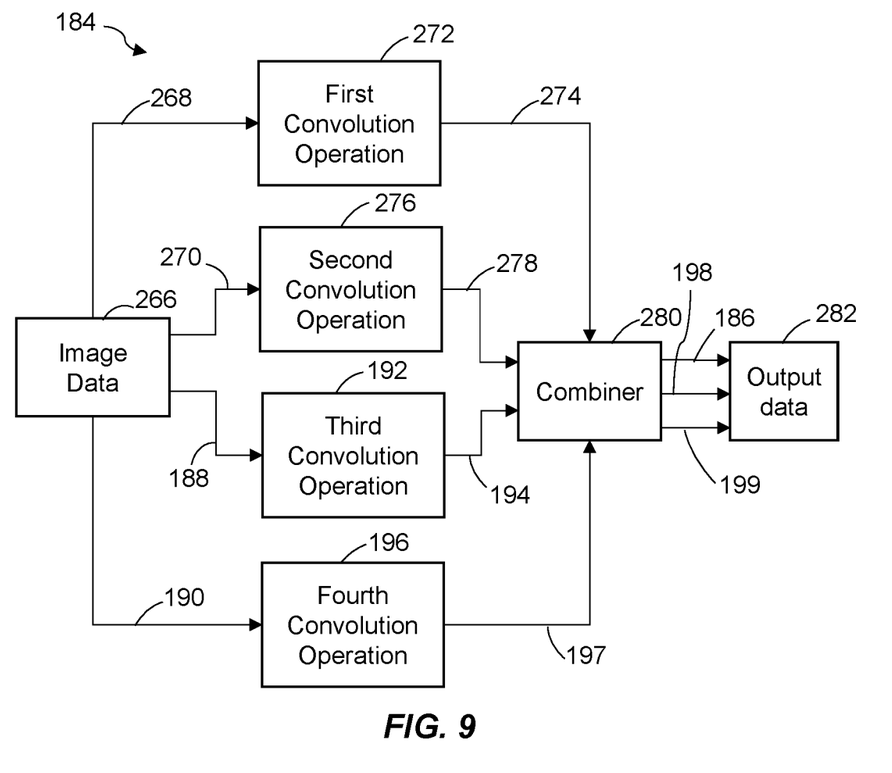
FIG. 9 is a schematic diagram showing a method of processing image data according to further examples.

FIG. 9 is a schematic diagram showing a method 184 of processing image data 266. Features of FIG. 9 similar to corresponding features of FIG. 8 are labelled with the same reference numeral but incremented by 100; corresponding descriptions are taken to apply. The method 184 of FIG. 9 may for example be used to perform a demosaicing algorithm to the image data 266, and may therefore be performed within the image processing pipeline 146 described above with reference to FIG. 7. In this way the method 184 of FIG. 8 may be performed for each of a first, second and third color channel in order to obtain, at each pixel location, an image data value for each of the three color channels. The method 184 of FIG. 9 includes applying the first convolution operation 272 to the first plurality of image data values 168 using the first kernel, and applying the second convolution operation 276 to the second plurality of image data values 270 using the second kernel, as described above with reference to FIG. 8. In this example, the combination calculated, as described above with reference to FIG. 8, of the first output 274 and the second output 278 is a first combination, and the image data value thereby generated for the first color channel is a first image data value 186 which is included in the output data 282.

In this example, the image data 266 also includes a third plurality of image data values 188 associated with a corresponding third plurality of pixel locations associated with a third color channel. The third color channel is different from both the first color channel and the second color channel. The third plurality of pixel locations is different from both the first and second plurality of pixel locations. The image data 266 also includes a fourth plurality of image data values 190 associated with a corresponding fourth plurality of pixel locations, different from the first, second and third plurality of pixel locations. The fourth plurality of pixel locations in this example is associated with the second color channel.

The method 184 of FIG. 9 includes applying a third convolution operation 192 to the third plurality of image data values 188 using a third kernel, thereby generating a third output 194. In this way, the third output 194 solely includes contributions from the third plurality of image data values 188, that is, the third output 194 solely contributions from image data values associated with the third color channel. This may be achieved by setting a dilation coefficient of the third kernel to two for example, as described above. The method 184 of FIG. 9 also includes applying a fourth convolution operation 196 to the fourth plurality of image data values 190 using a fourth kernel, thereby generating a fourth output 197. In this way, the fourth output 190 solely includes contributions from the fourth plurality of image data values 190, that is, the fourth output 197 solely contributions from image data values associated with the second color channel. This may be achieved by setting a dilation coefficient of the third kernel to two for example, as described above.

In the method of FIG. 9, the combiner 280 calculates, based on the pixel location, a second combination of the first output 274, the second output 278, the third output 194 and the fourth output 197. This generates, for the given pixel location, a second image data value 198 for the second color channel. The second combination may for example be any linear combination of the first output 274, the second output 278, the third output 194 and the fourth output 197.

In the method of FIG. 9, the combiner 280 also calculates, based on the pixel location, a third combination of the first output 274, the second output 278, the third output 194 and the fourth output 197. This generates, for the given pixel location, a third image data value 199 for the third color channel. The third combination may for example be any linear combination of the first output 274, the second output 278, the third output 194 and the fourth output 197.

In this example, the output data 282 includes the first image data value 186, the second image data value 198 and the third image data value 199. The method 184 of FIG. 9 therefore allows, for a pixel location associated with the second color channel, image data values associated with the first, second and third color channels to be obtained so that the output data 282 for the pixel location comprises an image data value for each color channel.

In an example of the method 184 of FIG. 9 where a Bayer filter array is used to capture the image represented by the image data 266, the first color channel may be the red color channel, the second color channel may be the green color channel and the third color channel may be the blue color channel. In this case, for the pixel location associated with the green color channel, the first output data value 186 is associated with the red color channel, the second image data value 198 is associated with the green color channel, and the third image data value 199 is associated with the blue color channel.

Figure 10:
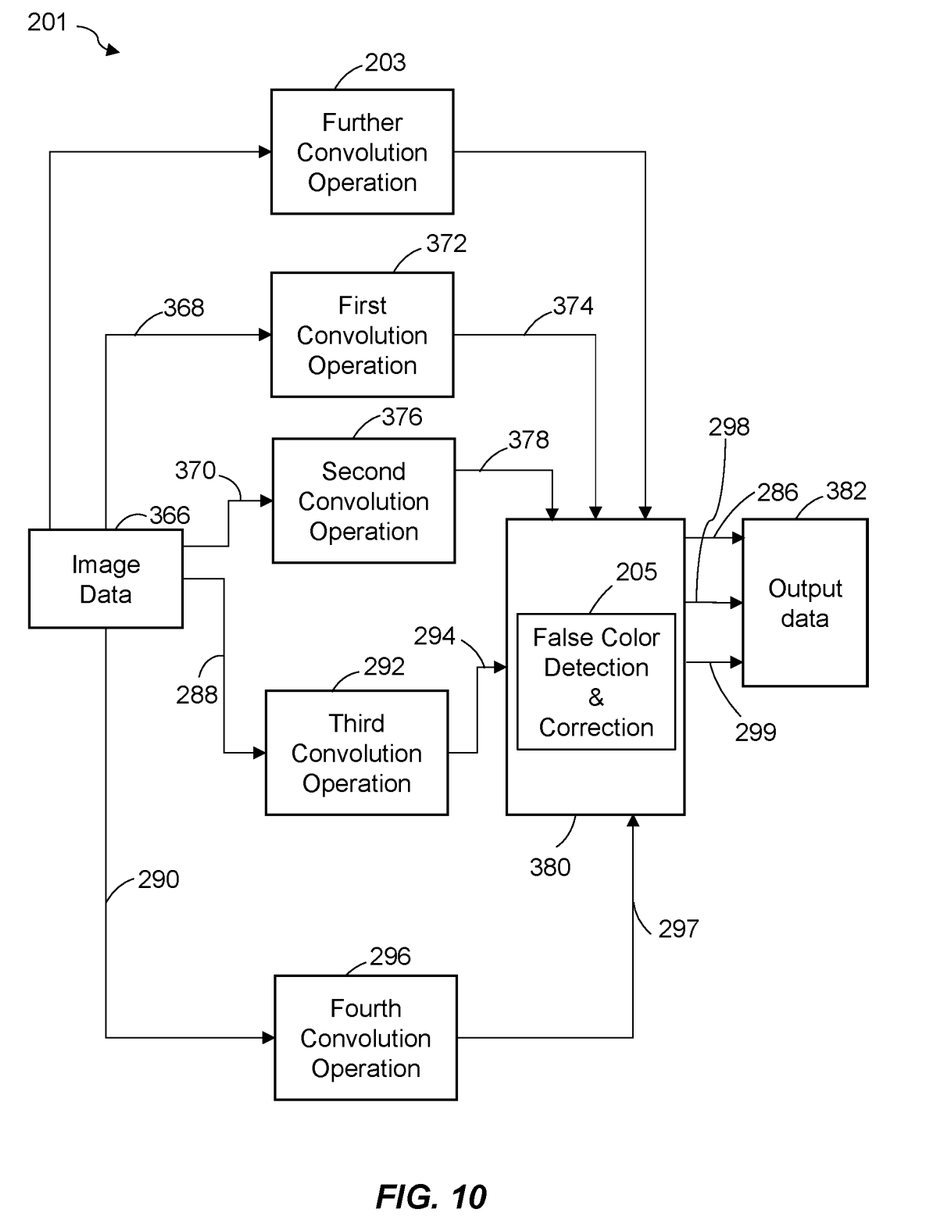
FIG. 10 is a schematic diagram showing a method of processing image data according to further examples.

FIG. 10 is a schematic diagram showing a method 201 of processing image data 366 that represents a combination of the examples described above with reference to FIGS. 5 to 9. Features of FIG. 10 similar to corresponding features of FIG. 9 are labelled with the same reference numeral but incremented by 100; corresponding descriptions are taken to apply.

In addition to applying the first, second, third and fourth convolution operations 372, 376, 292, 296 to the first, second further and fourth plurality of image data values 368, 370, 288, 290 respectively, and combining their respective outputs 374, 378, 294, 297 as described above in the method 184 of FIG. 9, the method 201 of FIG. 10 also includes a further convolution operation 203 applied to at least some of the plurality of image data values using a further kernel. The further convolution operation 203 may be similar to or the same as the further convolution operations 130, 230 of FIGS. 5 and 6, such that the further kernel represents a bandpass filter for edge detection. As described above with reference to FIG. 9, the first, second, third and fourth convolution operations 372, 376, 292, 296 may be used to perform a demosaicing algorithm to the image data 366, and may therefore be performed within the image processing pipeline 146 described above with reference to FIG. 7.

In the method 201 of FIG. 10, the combiner 380 applies false color detection and correction 205 to the output of performing the demosaicing algorithm as described above. This false color detection and correction 205 may be performed similarly to the false color detection and correction 158 of FIG. 7. In this example, the combiner 380 desaturates the region of the image, comprising an image data value with a measured error exceeding a threshold, using a fourth combination of the first output 374, the second output 378, the third output 294 and the fourth output 297. For example, the fourth combination may be an average of the first output 374, the second output 378, the third output 294 and the fourth output 297. This average may provide a shade of gray which can be used to desaturate the region of the image. Adding the average in this way to the region of image reduces the colorfulness of the region of the image and suppresses false colors in the region of the image As described above with reference to FIG. 9, the output data 382 includes the first image data value 286, the second image data value 298 and the third image data value 299. The method 201 of FIG. 10 therefore allows, for a pixel location associated with the second color channel, image data values associated with the first, second and third color channels to be obtained so that the output data 382 for the pixel location comprises an image data value for each color channel.

Figure 11:
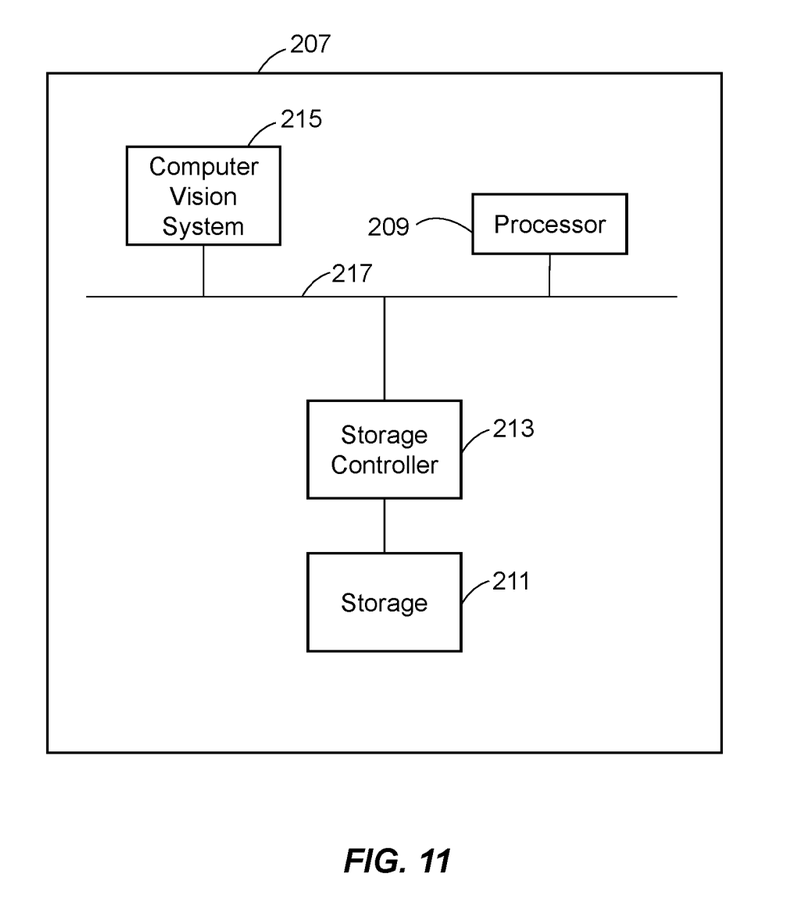
FIG. 11 is a schematic diagram showing an image processing system for use with the methods herein according to examples.

FIG. 11 is a schematic diagram showing an image processing system 207 for use to implement the methods described herein. The image processing system 207 comprises at least one processor 209, storage 211, a storage controller 213, and a computer vision system 215. The components of the image processing system 207 in the example of FIG. 11 are interconnected using a systems bus 217. This allows data to be transferred between the various components. The bus may be or include any suitable interface or bus. For example, an ARM® Advanced Microcontroller Bus Architecture (AMBA®) interface, such as the Advanced eXtensible Interface (AXI), may be used.

The processor 209 is configured to implement the methods described herein. For example, the processor 209 obtains image data comprising a plurality of image data values and processes the image data thereby generating output data. The processing of the image data includes applying a convolution to the plurality of image data values using a kernel comprising the plurality of coefficients. To apply the convolution operation, the processor 209 is operable to obtain a sum of image data values of the plurality of image data values that correspond respectively to coefficients of the plurality of coefficients that each have a common coefficient value. The processor 209 is also operable to multiply the sum by the common coefficient value. It is to be understood, however, that the at least one processor in this case may additionally be configured to perform other processing and/or controlling functions. Operations performed by the processor 209 may be carried out by hardware and/or software. The processor 209 may be implemented using machine readable instructions and suitably programmed or configured hardware, such as circuitry. The processor 209 can include a microprocessor, microcontroller, processor module or subsystem, programmable integrated circuit, programmable gate array or other computing device. The processor 209 may include multiple co-located processors or multiple disparately located processors. In some examples, the image processing system 207 includes computer-useable volatile and/or non-volatile storage configured to store information and/or instructions for each processor. In examples, the computer-useable storage may comprise random access memory (RAM) and/or read-only memory (ROM).

The processor 209 may be further operable to implement an image processing pipeline comprising a demosaicing algorithm as described above with reference to FIG. 7 and/or any of the other processing methods described above.

The image processing system 207 also includes storage 211 for storing the plurality of coefficients that comprise the kernel. Examples described herein reduce a capacity of the storage 211 required for storing the plurality coefficients by reducing the number of coefficients to be stored as explained in the examples above. The storage controller 213 may include a dynamic memory controller (DMC). The storage controller 213 is coupled to the storage 211. The storage controller 213 is configured to manage the flow of data going to and from the storage 211. The storage 211 may comprise a main storage, otherwise referred to as a "primary storage". The storage 211 in this example is comprised in the image processing system. For example, the storage may include 'on-chip' storage. The storage 211 may for example include a magnetic or optical disk and disk drive or a solid-state drive (SSD). In some examples, the storage comprises synchronous dynamic random-access memory (SDRAM). For example, the storage may comprise a double date rate synchronous dynamic random-access memory (DDR-SDRAM). In other examples, however, the storage 211 may be an external storage, in that the storage is external to the image processing system. For example, the storage 211 may include 'off-chip' storage. In such cases, the storage may include a central storage of a computing device within which the image processing system is located. In some cases, the storage 211 may be distributed between storage included in the image processing system and storage external to the image processing system, e.g. between 'on-chip' and 'off-chip' storage.

The image processing system 207 of FIG. 11 also includes a computer vision (CV) system 215 for implementing CV functionality,e.g. as described above in relation to FIG. 7. In some examples, the image data comprises green color channel data which is input to both the CV system 215 and the processor 209 which is operable to implement the image processing pipeline including the demosaicing algorithm. In other examples, though, methods herein may be implemented by an image processing system that is otherwise the same as the image processing system 207 of FIG. 11, but which lacks the CV system 215 (e.g. if the convolution is performed for demosaicing rather than for CV processing).

Further examples are envisaged. For example, FIG. 4 describes an example where the kernel 408 is symmetric. However, in other examples, the kernel 408 may be antisymmetric. An antisymmetric kernel may be described generally as a kernel comprising an array of coefficients, each coefficient given by $K_{ij}$, where i is a row number of the array of coefficients and j is a column number of the array of coefficients, for which $K_{ij}=(-K_{ji})$. Whether the kernel 408 is symmetric or antisymmetric may be depend on a purpose of applying the convolution operation 404 to the plurality of image data values $i_{11}$-$i_{55}$. In any case, the kernel 408 may still be represented by at least one common coefficient value, such as the six common coefficient values a, b, c, d, e and f of FIG. 4.

Some examples described herein have been described with reference to a Bayer pattern. However, it is to be understood that the examples described herein may be applied to other color filter patterns such as a combination of 2×2 pixel arrays of red, white, white, and blue filter elements or a combination of 2×2 pixel arrays of red, white, white and green filter elements, for example.

It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the accompanying claims.

What is claimed is:

1. An image processing method, comprising:
    obtaining image data, the image data comprising a plurality of image data values; and
    processing the image data, thereby generating output data, wherein processing the image data comprises applying a convolution operation to the plurality of image data values using a kernel comprising a plurality of coefficients, wherein applying the convolution operation comprises:
        obtaining a sum of image data values of the plurality of image data values that correspond respectively to coefficients of the plurality of coefficients that each have a common coefficient value; and
        multiplying the sum by the common coefficient value,
    wherein applying the convolution operation to the plurality of image data values forms at least part of a demosaicing algorithm within an image processing pipeline and wherein the image processing pipeline further comprises:
        detecting a region of the image comprising an image data value with a measured error exceeding a threshold, wherein the measured error is associated with the demosaicing algorithm; and
        processing a portion of the image data representing the region of the image to desaturate the region of the image.

2. The method of claim 1, wherein the common coefficient value is a first common coefficient value, the sum is a first sum, further coefficients of the plurality of coefficients each have a second common coefficient value, different from the first common coefficient value, and applying the convolution operation comprises:
    obtaining a second sum of image data values of the plurality of image data values that correspond respectively to the further coefficients; and
    multiplying the second sum by the second common coefficient value.

3. The method of claim 1, wherein the kernel is symmetric.

4. The method of claim 1, wherein the convolution operation is a first convolution operation, and the method comprises:
    applying a further convolution operation to at least some of the plurality of image data values using a further kernel, wherein the further kernel represents a bandpass filter for edge detection; and
    combining an output of the first convolution operation with a further output of the further convolution operation, thereby generating the output data.

5. The method of claim 4, wherein the plurality of image data values are associated with a plurality of pixel locations, respectively, each pixel location associated with one of a first color channel and a further color channel, different from the first color channel, the further convolution operation is applied to the at least some of the plurality of image data values, and the further output comprises equal contributions from pixel locations associated with the first color channel and pixel locations associated with the further color channel, independent of a pixel location associated with a respective image data value to which the further convolution operation is applied.

6. The method of claim 4, wherein the at least some of the plurality of image data values comprises a first set of the plurality of image data values, and the method comprises, for at least a second set of the plurality of the image data values, different from the first set of the plurality of the image data values, determining to bypass the applying of the further convolution operation to at least the second set of the plurality of image data values.

7. The method of claim 6, wherein the determining is based on an amount of information related to at least one color channel in the second set of the plurality of image data values.

8. The method of claim 7, wherein the amount of information related to the at least one color channel in the second set of the plurality of image data values is less than an amount of information related to the at least one color channel in the first set of the plurality of image data values.

9. The method of claim 1, wherein the image data comprises green color channel data, and the method comprises inputting the green color channel data to both the demosaicing algorithm and a computer vision system.

10. The method of claim 1, wherein the convolution operation is applied to implement at least part of a neural network architecture.

11. The method of claim 1, wherein the plurality of image data values is a first plurality of image data values associated with a corresponding first plurality of pixel locations associated with a first color channel, the image data further comprises a second plurality of image data values associated with a corresponding second plurality of pixel locations associated with a second color channel, different from the first color channel, the second plurality of pixel locations different from the first plurality of pixel locations, the convolution operation is a first convolution operation and the kernel is a first kernel, and the method comprises applying a second convolution operation to the second plurality of image data values using a second kernel.

12. The method of claim 11, wherein the first convolution operation is applied to the first plurality of image data values, thereby generating a first output, the second convolution operation is applied to the second plurality of image data values, thereby generating a second output, and the method comprises obtaining, for a pixel location of the second plurality of pixel locations, an image data value for the first color channel, wherein obtaining the image data value comprises calculating, based on the pixel location, a combination of the first output and the second output, wherein the output data comprises the image data value.

13. The method of claim 12, wherein the image data value is a first image data value and the combination is a first combination, wherein the image data further comprises:
    a third plurality of image data values associated with a corresponding third plurality of pixel locations associated with a third color channel, different from the first color channel and the second color channel, the third plurality of pixel locations different from the first and second plurality of pixel locations; and a fourth plurality of image data values associated with a corresponding fourth plurality of pixel locations associated with the second color channel, the fourth plurality of pixel locations, different from the first, second and third plurality of pixel locations, wherein the method comprises:

applying a third convolution operation to the third plurality of image data values using a third kernel, thereby generating a third output;

applying a fourth convolution operation to the fourth plurality of image data values using a fourth kernel, thereby generating a fourth output;

calculating, based on the pixel location, a second combination of the first output, the second output, the third output and the fourth output, thereby generating, for the pixel location, a second image data value for the second color channel; and calculating, based on the pixel location, a third combination of the first output, the second output, the third output and the fourth output, thereby generating, for the pixel location, a third image data value for the third color channel, wherein the output data comprises the second image data value and the third image data value.

14. An image processing system, comprising:

storage for storing a plurality of coefficients; and at least one processor to:

obtain image data, the image data comprising a plurality of image data values; and process the image data, thereby generating output data, wherein processing the image data comprises applying a convolution operation to the plurality of image data values using a kernel comprising the plurality of coefficients, wherein applying the convolution operation comprises:

obtaining a sum of image data values of the plurality of image data values that correspond respectively to coefficients of the plurality of coefficients that each have a common coefficient value; and multiplying the sum by the common coefficient value, wherein the at least one processor is operable to implement an image processing pipeline comprising a demosaicing algorithm, wherein applying the convolution operation to the plurality of image data values forms at least part of the demosaicing algorithm, and wherein the image processing pipeline is operable to:

detect a region of the image comprising an image data value with a measured error exceeding a threshold, wherein the measured error is associated with the demosaicing algorithm; and process a portion of the image data representing the region of the image to desaturate the region of the image.

15. The image processing system of claim 14, wherein the common coefficient value is a first common coefficient value, the sum is a first sum, further coefficients of the plurality of coefficients each have a second common coefficient value, different from the first common coefficient value, and applying the convolution operation comprises:

obtaining a second sum of image data values of the plurality of image data values that correspond respectively to the further coefficients; and multiplying the second sum by the second common coefficient value.

16. The image processing system of claim 14, wherein the convolution operation is a first operation, and the at least one processor is operable to:

apply a further convolution operation to at least some of the plurality of image data values using a further kernel, wherein the further kernel represents a bandpass filter for edge detection; and combine an output of the first convolution operation with a further output of the further convolution operation, thereby generating the output data.

17. The image processing system of claim 14, wherein the image processing system comprises a computer vision system, the image data comprises green color channel data, and the at least one processor is operable to input the green color channel data to both the demosaicing algorithm and the computer vision system.

* * * * *